111010110001 = 3761

101100010111 = 2839

110110000111 = 3463

1001011000001001011010010 = 9835218

3761 + 2839.3463 = 9835218

INVENTORS
SIMON DUINKER
HERMAN JACOB HEIJN
BY Frank R. Trifari
AGENT

| n° | $z_2$ $z_1$ $z_0$ | s | e | op. | c | n° | $z_2$ $z_1$ $z_0$ | s | e | op. | c |
|---|---|---|---|---|---|---|---|---|---|---|---|
| 1 | 0 0 0 | + | 0 | 0.3R.n.0 | w – | 13 | 0 0 0 | + | 1 | +.3R.n.0 | q – |
| 2 | 0 0 1 | + | 0 | +.3R.n.0 | q – | 14 | 0 0 1 | + | 1 | 0.1R.n.1 | u – |
| 3 | 0 1 0 | + | 0 | 0.1R.n.0 | u – | 15 | 0 1 0 | + | 1 | 0.0R.i.1 | – i |
| 4 | 0 1 1 | + | 0 | 0.0R.i.0 | – i | 16 | 0 1 1 | + | 1 | 0.2R.n.1 | v – |
| 5 | 1 0 0 | + | 0 | 0.2R.n.0 | v – | 17 | 1 0 0 | + | 1 | +.2R.n.0 | p – |
| 6 | 1 0 1 | + | 0 | +.2R.n.0 | p – | 18 | 1 0 1 | + | 1 | 0.1R.i.1 | u, i |
| 7 | 1 1 0 | + | 0 | 0.1R.i.0 | u, i | 19 | 1 1 0 | + | 1 | 0.0R.i.1 | – i |
| 8 | 1 1 1 | + | 0 | 0.0R.i.0 | – i | 20 | 1 1 1 | + | 1 | 0.3R.n.1 | w – |
| 9 | 0 1 0 | – | 0 | 0.1R.i.0 | u, i | 21 | 0 0 0 | – | 1 | 0.0R.i.1 | – i |
| 10 | 0 1 1 | – | 0 | +.2R.n.1 | p – | 22 | 0 1 0 | – | 1 | +.2R.i.1 | p, i |
| 11 | 1 1 0 | – | 0 | 0.1R.n.0 | u – | 23 | 1 0 0 | – | 1 | 0.0R.i.1 | – i |
| 12 | 1 1 1 | – | 0 | +.3R.i.1 | q, i | 24 | 1 1 0 | – | 1 | +.3R.i.1 | q, i |

FIG.2

| n° | $z_1$ $z_0$ | s | e | op. | n° | $z_1$ $z_0$ | s | e | op. |
|---|---|---|---|---|---|---|---|---|---|
| 1 | 0 0 | + | 0 | 0.2R.n.0 | 9 | 0 0 | + | 1 | +.2R.n.0 |
| 2 | 0 1 | + | 0 | +.2R.n.0 | 10 | 0 1 | + | 1 | 0.1R.n.1 |
| 3 | 1 0 | + | 0 | 0.1R.n.0 | 11 | 1 0 | + | 1 | +.1R.i.0 |
| 4 | 1 1 | + | 0 | +.1R.i.0 | 12 | 1 1 | + | 1 | 0.2R.n.1 |
| 5 | 0 0 | – | 0 | 0.2R.n.0 | 13 | 0 0 | – | 1 | +.1R.i.1 |
| 6 | 0 1 | – | 0 | +.1R.i.1 | 14 | 0 1 | – | 1 | 0.1R.n.1 |
| 7 | 1 0 | – | 0 | 0.1R.n.0 | 15 | 1 0 | – | 1 | +.2R.i.1 |
| 8 | 1 1 | – | 0 | +.2R.i.1 | 16 | 1 1 | – | 1 | 0.2R.n.1 |

FIG.3

INVENTORS
SIMON DUINKER
HERMAN JACOB HEIJN
BY
[signature]
AGENT

| n° | $z_3$ $z_2$ $z_1$ $z_0$ | s | e | op. | n° | $z_3$ $z_2$ $z_1$ $z_0$ | s | e | op. |
|---|---|---|---|---|---|---|---|---|---|
| 1 | 0 0 0 0 | + | 0 | 0.4R.n.0 | 21 | 0 0 0 0 | + | 1 | +.4R.n.0 |
| 2 | 0 0 0 1 | + | 0 | +.4R.n.0 | 22 | 0 0 0 1 | + | 1 | 0.1R.n.1 |
| 3 | 0 0 1 0 | + | 0 | 0.1R.n.0 | 23 | 0 0 1 0 | + | 1 | +.1R.n.0 |
| 4 | 0 0 1 1 | + | 0 | +.1R.n.0 | 24 | 0 0 1 1 | + | 1 | 0.2R.n.1 |
| 5 | 0 1 0 0 | + | 0 | 0.2R.n.0 | 25 | 0 1 0 0 | + | 1 | +.2R.n.0 |
| 6 | 0 1 0 1 | + | 0 | +.2R.n.0 | 26 | 0 1 0 1 | + | 1 | 0.1R.i.1 |
| 7 | 0 1 1 0 | + | 0 | 0.1R.i.0 | 27 | 0 1 1 0 | + | 1 | 0.0R.i.1 |
| 8 | 0 1 1 1 | + | 0 | 0.0R.i.0 | 28 | 0 1 1 1 | + | 1 | 0.3R.n.1 |
| 9 | 1 0 0 0 | + | 0 | 0.3R.n.0 | 29 | 1 0 0 0 | + | 1 | +.3R.n.0 |
| 10 | 1 0 0 1 | + | 0 | +.3R.n.0 | 30 | 1 0 0 1 | + | 1 | 0.1R.n.1 |
| 11 | 1 0 1 0 | + | 0 | 0.1R.n.0 | 31 | 1 0 1 0 | + | 1 | +.1R.n.0 |
| 12 | 1 0 1 1 | + | 0 | +.1R.n.0 | 32 | 1 0 1 1 | + | 1 | 0.2R.i.1 |
| 13 | 1 1 0 0 | + | 0 | 0.2R.i.0 | 33 | 1 1 0 0 | + | 1 | +.2R.i.0 |
| 14 | 1 1 0 1 | + | 0 | +.2R.i.0 | 34 | 1 1 0 1 | + | 1 | 0.1R.i.1 |
| 15 | 1 1 1 0 | + | 0 | 0.1R.i.0 | 35 | 1 1 1 0 | + | 1 | 0.0R.i.1 |
| 16 | 1 1 1 1 | + | 0 | 0.0R.i.0 | 36 | 1 1 1 1 | + | 1 | 0.4R.n.1 |
| 17 | 0 0 1 1 | - | 0 | +.2R.i.1 | 37 | 0 0 1 0 | - | 1 | +.2R.i.1 |
| 18 | 0 1 1 1 | - | 0 | +.3R.i.1 | 38 | 0 1 1 0 | - | 1 | +.3R.i.1 |
| 19 | 1 0 1 1 | - | 0 | +.2R.n.1 | 39 | 1 0 1 0 | - | 1 | +.2R.n.1 |
| 20 | 1 1 1 1 | - | 0 | +.4R.i.1 | 40 | 1 1 1 0 | - | 1 | +.4R.i.1 |

FIG.4

INVENTORS
SIMON DUINKER
HERMAN JACOB HEIJN
BY
AGENT

| n° | $z_4$ $z_3$ $z_2$ $z_1$ $z_0$ | s | e | op. | n° | $z_4$ $z_3$ $z_2$ $z_1$ $z_0$ | s | e | op. |
|---|---|---|---|---|---|---|---|---|---|
| 1 | 0 0 0 0 0 | + | 0 | 0.5 R.n.0 | 41 | 0 0 0 0 0 | + | 1 | +.5 R.n.0 |
| 2 | 0 0 0 0 1 | + | 0 | +.5 R.n.0 | 42 | 0 0 0 0 1 | + | 1 | 0.1 R.n.1 |
| 3 | 0 0 0 1 0 | + | 0 | 0.1 R.n.0 | 43 | 0 0 0 1 0 | + | 1 | +.1 R.n.0 |
| 4 | 0 0 0 1 1 | + | 0 | +.1 R.n.0 | 44 | 0 0 0 1 1 | + | 1 | 0.2 R.n.1 |
| 5 | 0 0 1 0 0 | + | 0 | 0.2 R.n.0 | 45 | 0 0 1 0 0 | + | 1 | +.2 R.n.0 |
| 6 | 0 0 1 0 1 | + | 0 | +.2 R.n.0 | 46 | 0 0 1 0 1 | + | 1 | 0.1 R.i.1 |
| 7 | 0 0 1 1 0 | + | 0 | 0.1 R.i.0 | 47 | 0 0 1 1 0 | + | 1 | 0.0 R.i.1 |
| 8 | 0 0 1 1 1 | + | 0 | 0.0 R.i.0 | 48 | 0 0 1 1 1 | + | 1 | 0.3 R.n.1 |
| 9 | 0 1 0 0 0 | + | 0 | 0.3 R.n.0 | 49 | 0 1 0 0 0 | + | 1 | +.3 R.n.0 |
| 10 | 0 1 0 0 1 | + | 0 | +.3 R.n.0 | 50 | 0 1 0 0 1 | + | 1 | 0.1 R.n.1 |
| 11 | 0 1 0 1 0 | + | 0 | 0.1 R.n.0 | 51 | 0 1 0 1 0 | + | 1 | +.1 R.n.0 |
| 12 | 0 1 0 1 1 | + | 0 | +.1 R.n.0 | 52 | 0 1 0 1 1 | + | 1 | 0.2 R.i.1 |
| 13 | 0 1 1 0 0 | + | 0 | 0.2 R.i.0 | 53 | 0 1 1 0 0 | + | 1 | +.2 R.i.0 |
| 14 | 0 1 1 0 1 | + | 0 | +.2 R.i.0 | 54 | 0 1 1 0 1 | + | 1 | 0.1 R.i.1 |
| 15 | 0 1 1 1 0 | + | 0 | 0.1 R.i.0 | 55 | 0 1 1 1 0 | + | 1 | 0.0 R.i.1 |
| 16 | 0 1 1 1 1 | + | 0 | 0.0 R.i.0 | 56 | 0 1 1 1 1 | + | 1 | 0.4 R.n.1 |
| 17 | 1 0 0 0 0 | + | 0 | 0.4 R.n.0 | 57 | 1 0 0 0 0 | + | 1 | +.4 R.n.0 |
| 18 | 1 0 0 0 1 | + | 0 | +.4 R.n.0 | 58 | 1 0 0 0 1 | + | 1 | 0.1 R.n.1 |
| 19 | 1 0 0 1 0 | + | 0 | 0.1 R.n.0 | 59 | 1 0 0 1 0 | + | 1 | +.1 R.n.0 |
| 20 | 1 0 0 1 1 | + | 0 | +.1 R.n.0 | 60 | 1 0 0 1 1 | + | 1 | 0.2 R.n.1 |
| 21 | 1 0 1 0 0 | + | 0 | 0.2 R.n.0 | 61 | 1 0 1 0 0 | + | 1 | +.2 R.n.0 |
| 22 | 1 0 1 0 1 | + | 0 | +.2 R.n.0 | 62 | 1 0 1 0 1 | + | 1 | 0.1 R.n.1 |
| 23 | 1 0 1 1 0 | + | 0 | 0.1 R.i.0 | 63 | 1 0 1 1 0 | + | 1 | 0.0 R.i.1 |
| 24 | 1 0 1 1 1 | + | 0 | 0.0 R.i.0 | 64 | 1 0 1 1 1 | + | 1 | 0.3 R.i.1 |
| 25 | 1 1 0 0 0 | + | 0 | 0.3 R.i.0 | 65 | 1 1 0 0 0 | + | 1 | +.3 R.i.0 |
| 26 | 1 1 0 0 1 | + | 0 | +.3 R.i.0 | 66 | 1 1 0 0 1 | + | 1 | 0.1 R.n.1 |
| 27 | 1 1 0 1 0 | + | 0 | 0.1 R.n.0 | 67 | 1 1 0 1 0 | + | 1 | +.1 R.n.0 |
| 28 | 1 1 0 1 1 | + | 0 | +.1 R.n.0 | 68 | 1 1 0 1 1 | + | 1 | 0.2 R.i.1 |
| 29 | 1 1 1 0 0 | + | 0 | 0.2 R.i.0 | 69 | 1 1 1 0 0 | + | 1 | +.2 R.i.0 |
| 30 | 1 1 1 0 1 | + | 0 | +.2 R.i.0 | 70 | 1 1 1 0 1 | + | 1 | 0.1 R.i.1 |
| 31 | 1 1 1 1 0 | + | 0 | 0.1 R.i.0 | 71 | 1 1 1 1 0 | + | 1 | 0.0 R.i.1 |
| 32 | 1 1 1 1 1 | + | 0 | 0.0 R.i.0 | 72 | 1 1 1 1 1 | + | 1 | 0.5 R.n.1 |
| 33 | 0 0 0 1 1 | - | 0 | +.2 R.i.1 | 73 | 0 0 0 1 0 | - | 1 | +.2 R.i.1 |
| 34 | 0 0 1 1 1 | - | 0 | +.3 R.i.1 | 74 | 0 0 1 1 0 | - | 1 | +.3 R.i.1 |
| 35 | 0 1 0 1 1 | - | 0 | +.2 R.n.1 | 75 | 0 1 0 1 0 | - | 1 | +.2 R.n.1 |
| 36 | 0 1 1 1 1 | - | 0 | +.4 R.i.1 | 76 | 0 1 1 1 0 | - | 1 | +.4 R.i.1 |
| 37 | 1 0 0 1 1 | - | 0 | +.2 R.i.1 | 77 | 1 0 0 1 0 | - | 1 | +.2 R.i.1 |
| 38 | 1 0 1 1 1 | - | 0 | +.3 R.n.1 | 78 | 1 0 1 1 0 | - | 1 | +.3 R.n.1 |
| 39 | 1 1 0 1 1 | - | 0 | +.2 R.n.1 | 79 | 1 1 0 1 0 | - | 1 | +.2 R.n.1 |
| 40 | 1 1 1 1 1 | - | 0 | +.5 R.i.1 | 80 | 1 1 1 1 0 | - | 1 | +.5 R.i.1 |

FIG.5

INVENTORS
SIMON DUINKER
HERMAN JACOB HEIJN
BY
Frank R. Jeifari
AGENT

INVENTORS
SIMON DUINKER
HERMAN JACOB HEIJN
BY
Frank R. Jifani
AGENT

INVENTORS
SIMON DUINKER
HERMAN JACOB HEIJN
BY
AGENT

Feb. 6, 1962 S. DUINKER ETAL 3,019,977

PARALLEL-OPERATING SYNCHRONOUS DIGITAL COMPUTER CAPABLE OF PERFORMING THE CALCULATION X+Y.Z AUTOMATICALLY

Filed March 17, 1958 9 Sheets-Sheet 7

INVENTORS
SIMON DUINKER
HERMAN JACOB HEIJN
BY
AGENT

Feb. 6, 1962 S. DUINKER ETAL 3,019,977

PARALLEL-OPERATING SYNCHRONOUS DIGITAL COMPUTER CAPABLE OF PERFORMING THE CALCULATION X + Y.Z AUTOMATICALLY

Filed March 17, 1958 9 Sheets-Sheet 8

INVENTOR
SIMON DUINKER
HERMAN JACOB HEIJN

BY Frank R. Jifari
AGENT

INVENTORS
SIMON DUINKER
HERMAN JACOB HEIJN
BY
AGENT

United States Patent Office 3,019,977

Patented Feb. 6, 1962

3,019,977

PARALLEL-OPERATING SYNCHRONOUS DIGITAL COMPUTER CAPABLE OF PERFORMING THE CALCULATION x+Y.Z AUTOMATICALLY

Simon Duinker and Herman Jacob Heijn, Eindhoven, Netherlands, assignors to North American Philips Company Inc., New York, N.Y., a corporation of Delaware Filed Mar. 17, 1958, Ser. No. 722,039
Claims priority, application Netherlands Mar. 16, 1957
6 Claims. (Cl. 235—157)

This invention relates to parallel-operating digital computers capable of performing the calculation $x+y.z$ automatically, which comprise a calculating unit substantially constituted by a first register for registering the number $x$, a second register for registering the number $y$, a third register for registering the number $z$ and an arithmetical element which produces the sum or the difference of the numbers registered in the first and second registers and which can transfer this result, under the control of a micro-control circuit, possibly shifted, to the first register and, as the case may be, also to part of the third register. The term "synchronous computer" as used herein denotes a computer comprising a clock pulse generator governing the operation of the computer. The time interval between two successive clock pulses of the clock pulse generator is termed a "stroke" of the computer. The term "micro-control circuit" is to be understood in this case to mean that part of the control circuit which controls the details of the complete arithmetic operations which the machine can perform automatically (such as additions, subtractions, multiplications, divisions, etc.). It is known that the calculation concerned may be performed by successively carrying out additions of the numbers registered in the first and second registers and shifting one step to the right or to the left (that is to say from the most important digit to the least important digit, or conversely) the number registered in the first register and possibly also the number registered in the third register. It is practical if the numbers shifting out of the first register are shifted to the digit places of the third register which come free, so that these two registers jointly constitute a compound register. The digit of the number $z$ which is being handled is in this case always the digit of the lowest order of the third register. For performing calculations with negative numbers, the calculating unit usually also comprises a member which can invert the number registered in the second register. However, as an alternative, the calculating unit may comprise, for the same purpose, a difference producer which can be built up on the same principles as an adder. It is also known to carry out an addition and a shift one step to the right or to the left in one stroke of the machine by registering the sum produced in the adder, shifted one step to the right or to the left, in the first register and, as the case may be, part of the third register. In a binary calculating unit, the whole calculation then requires as many strokes as the third register contains digit places. The object of the invention is to speed up the calculation by decreasing the number of strokes required for calculation. According to the invention, the micro-control circuit receives information about the digit of the number $z$ and about the next-following $n-1$ digits of the number $z$, which are to be handled during the next strokes of the machine, wherein $n \geqq 2$, whilst upon each stroke of the machine the micro-control circuit makes a choice dependent, according to fixed laws, upon the information produced by these $n$-digits, from a plurality of micro-instructions for the calculating unit, said instructions being, for example, shifts in the first register and possibly also the second register, transfer of the number produced in the arithmetic element to the first register and possibly also part of the third register, or combinations of such micro-instructions. The difference with respect to known machines is that the micro-control circuit now can make a choice not only from the two instructions "do not transfer the number produced in the arithmetic element to the first register" and "transfer the number produced in the arithmetic element to the first register" (this may be accompanied or not accompanied by a shift in the first and possibly also the third register), but can make a choice from a larger number of micro-instructions. This affords the possibility to handle two or more digits of the number $z$ in one or two strokes as soon as a combination of digits occurs in the number $z$ which affords this possibility. With an efficacious choice of the instruction diagram, this results in a decrease of the number of strokes required for performing a calculation.

In order that the invention may be readily carried into effect, one embodiment will now be described more fully, by way of example, with reference to the accompanying drawings, in which:

FIG. 2 shows the complete instruction diagram associated with the example of FIG. 1.

FIGS. 3, 4 and 5 show instruction diagrams for the cases in which the micro-control circuit receives information about two, four, and five sequential digits, respectively, of the number $z$.

Figure 6:
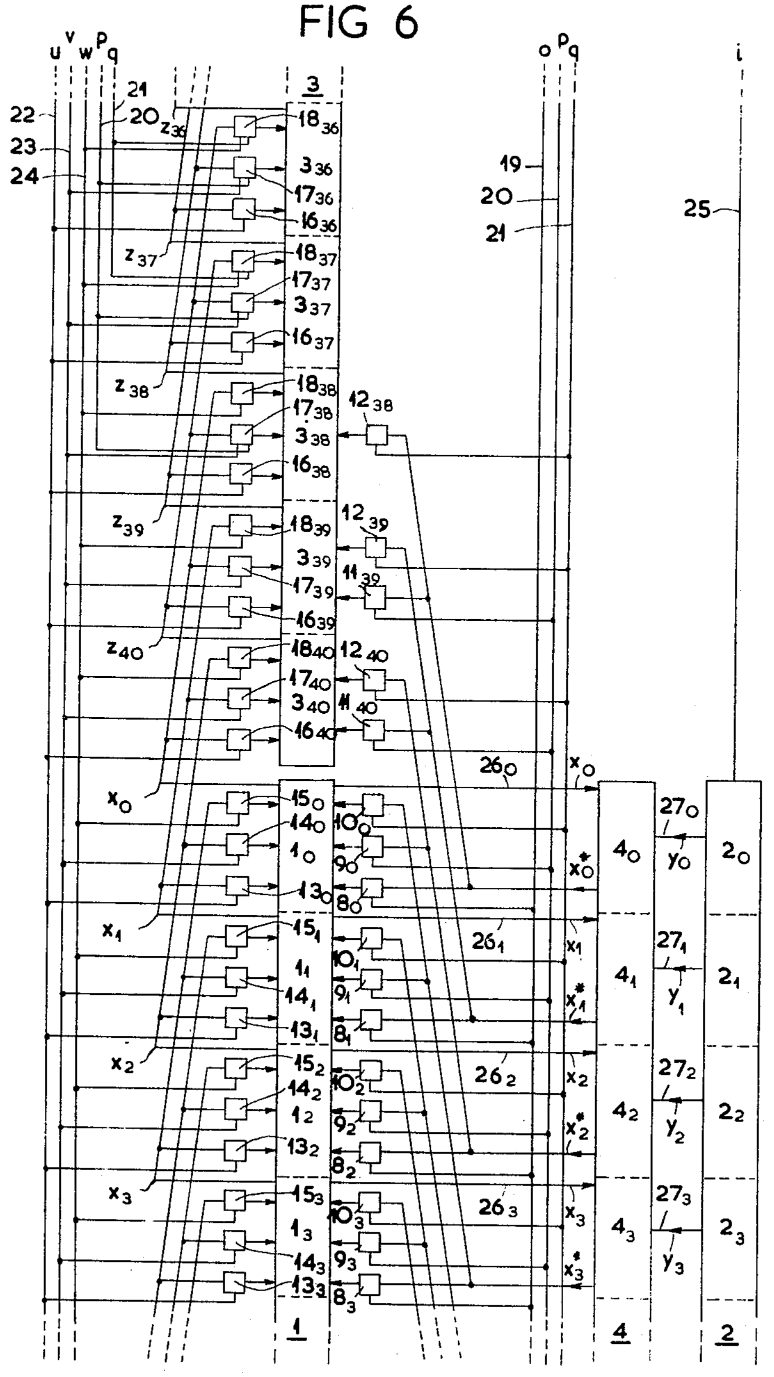
FIG. 6 shows a diagram of part of a calculating unit according to the invention, in which the micro-control circuit receives information about the last three digits of the first register.
Figure 7:
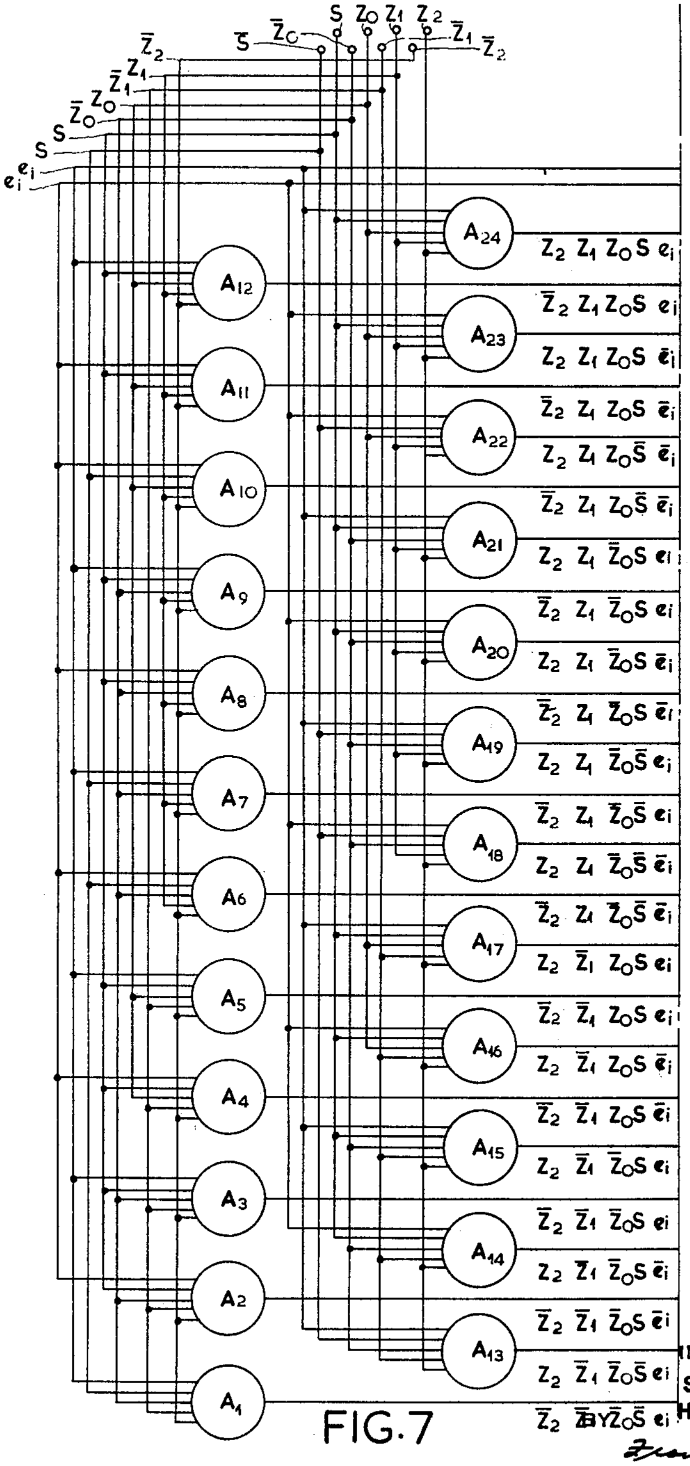
Figure 7A:
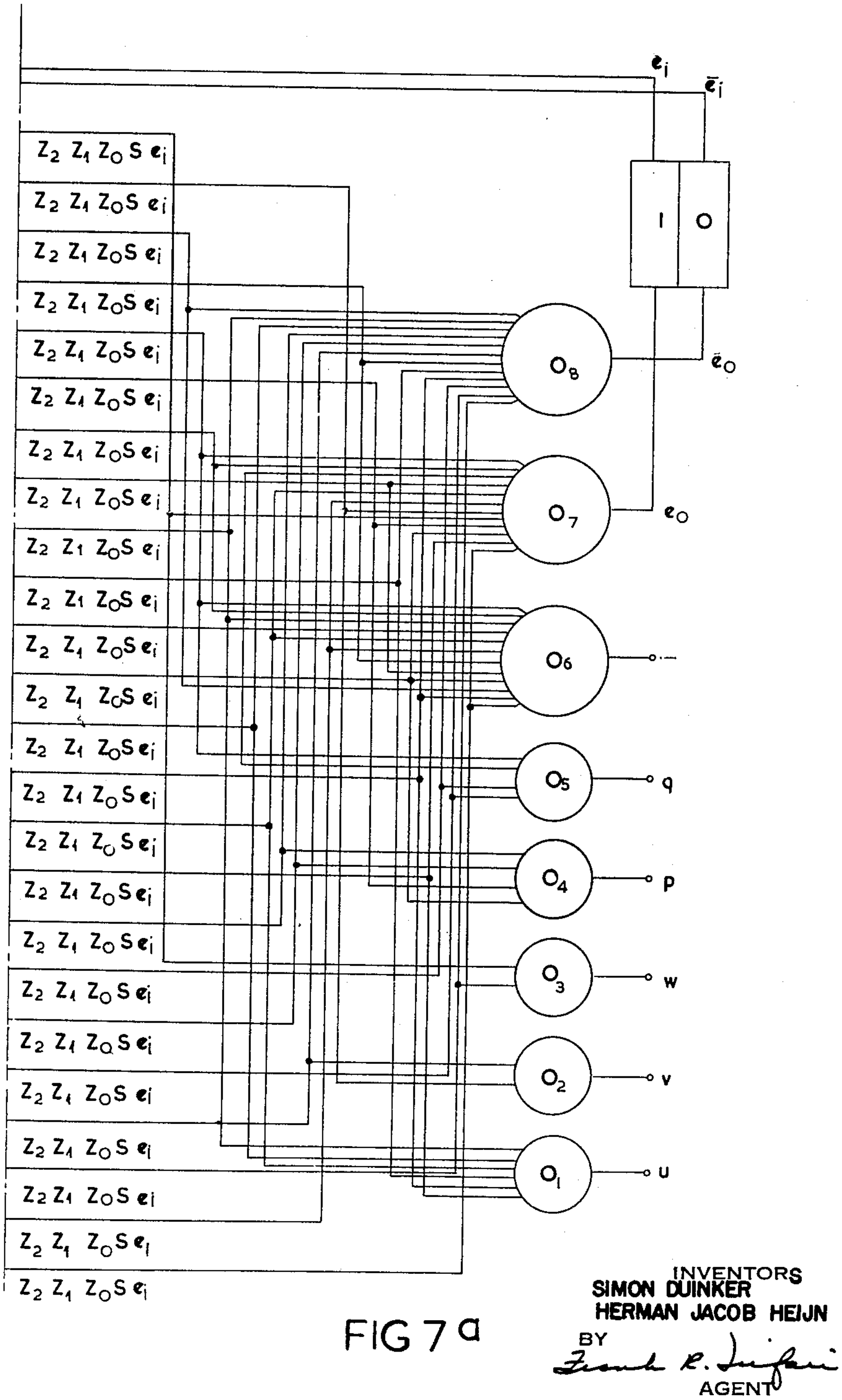

FIGS. 7 and 7*a* show a diagram of the micro-control circuit of the calculating unit shown diagrammatically in FIG. 6.

Figure 8:
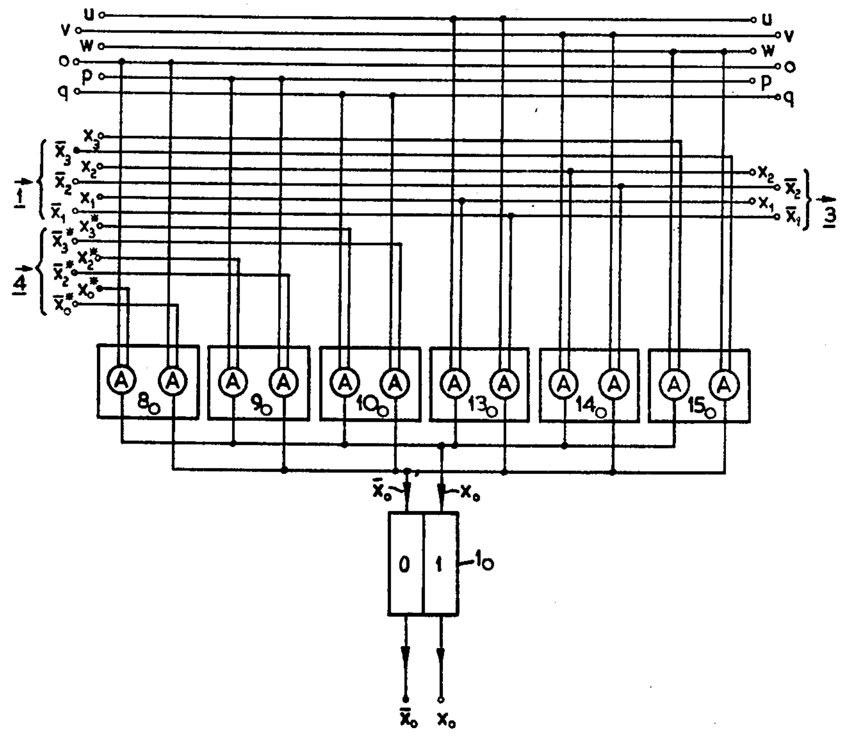
Figure 9:
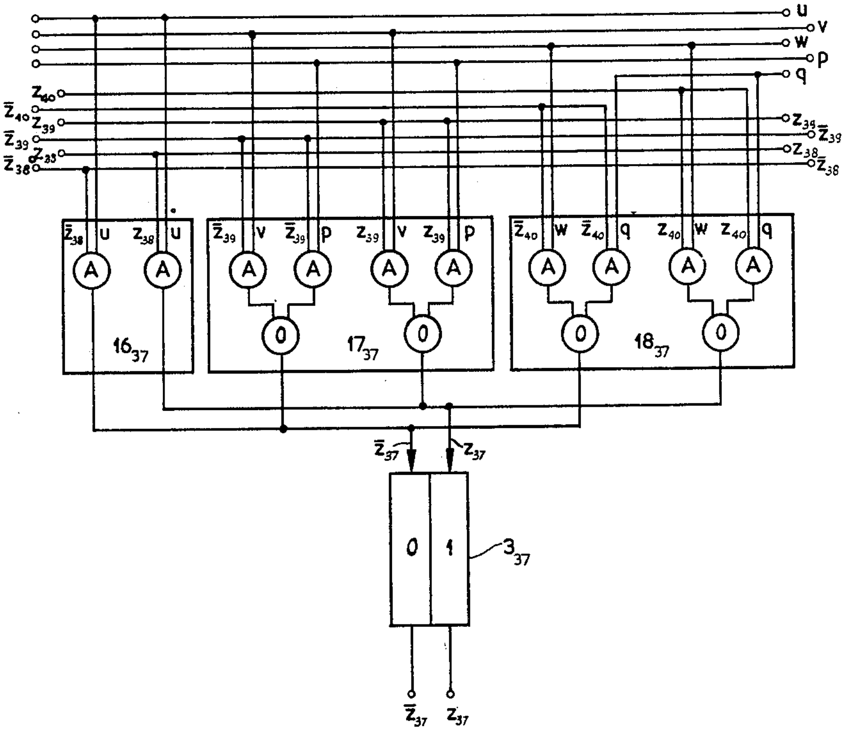

FIGS. 8 and 9 show diagrams of two further details of the calculating unit shown diagrammatically in FIG. 6.

Figure 1:
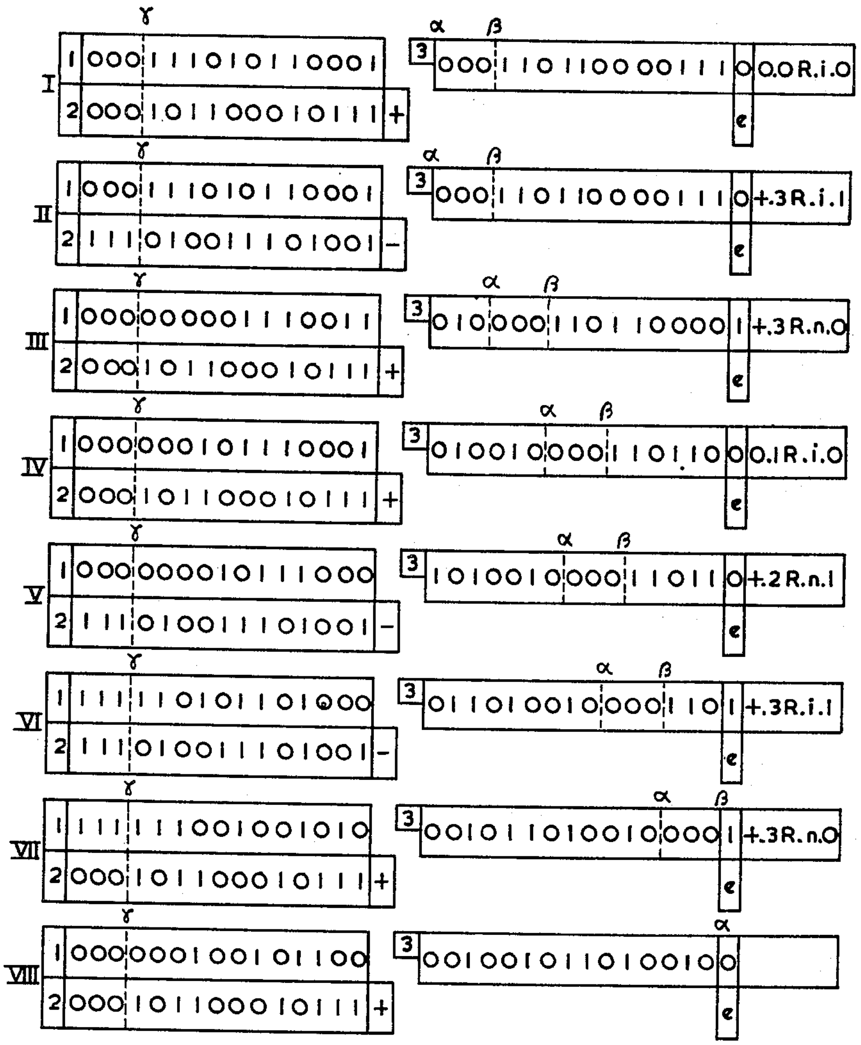
FIG. 1 shows an example of the manner in which the magnitude $x+y.z$ may be calculated in the binary system with the use of the information produced by three sequential digits of the number $z$.

Referring now to FIG. 1, this figure shows the manner in which the expression 3761+2839.3463 may be calculated in accordance with the invention with the use of the binary system. According to the binary system $$3761=111010110001,\ 2839=101100010111,\ 3463=110110000111.$$

The micro-control circuit receives information about the last three digits ($z_2$, $z_1$, $z_0$,) of the number registered in the third register and also information about the form (as the number or its true complement) in which the number $y$ has been registered in the second register and about the question as to whether an additional digit 0 or an additional digit 1 has been memorised, during the previous stroke of the machine. The calculation amounts to the fact that the number $z=110110000111$ is replaced by the equivalent sum—

$$0000000000001+0000000001000-0000010000000$$
$$-0001000000000+1000000000000$$
$$(=1000000001000-0001010000001).$$

At the beginning of a calculation, the additional digit is always 0.

During the first stroke, the number registered in the second register is replaced by its true complement, an operation which will be referred to hereinafter as inversion. In FIG. 1, this is indicated by the symbol 0.0R.*i*.0, which means: don't add, don't shift, invert, memorise an additional digit 0. The registers occupy the position II after this stroke. The — sign after the register 2 in the position II indicates that the number $y$ has been registered in the inverted form in this register. (In position I, this number was registered in the non-inverted form in the register 2 which is indicated by the sign +.) The digit 0 above the compartment $e$ in the position II indicates that an additional digit 0 has been memorised in the first stroke. In the second stroke, the contents of the second register are added to those of the first register, the new contents of the first register and the contents of the third register are shifted to the right over three digit places, the contents of the second register are inverted and an additional digit 1 is memorised. In FIG. 1, this is indicated by the symbol +.3R.$i$.1, which means: add, shift three places to the right, invert, memorise the additional digit 1. After this stroke, the registers occupy the position III. Now, the number $x-y$ is registered in the first register and the first three digit places of the third register. The additional digit 1 (above compartment $e$) which is memorised indicates that the number registered in the third register must be imagined to be increased by 1. In the third stroke, the contents of the second register (in which the number $y$ has been registered in the non-inverted form) are added to those of the first register, the new contents of the first register and the contents of the third register are shifted to the right over three digit places, are not inverted and the additional digit 0 is memorised. The symbol therefor is +.3R.$n$.0. After this stroke, the registers occupy the position IV. The operations so far performed amount to the production of the sum x+2839. (−0000000000001+ +0000000001000). The fourth stroke consists in shifting the contents of the first and third registers to the right over one digit place, inverting the contents of the second register and memorising (thus actually maintaining), the additional digit 0. The symbol therefor is 0.1R.$i$.0. The registers thus occupy the position V. The subsequent fifth stroke consists in adding the contents of the first and second registers, shifting the new contents of the first register and the contents of the third register to the right over two digit places and memorising the additional digit 1. The symbol therefor is +.2R.$n$.1. The registers then occupy the position VI. The sixth stroke consists in adding the contents of the first and second registers, shifting the new contents of the first register and the contents of the third register to the right over three places, inverting the contents of the second register and memorising (so actually maintaining) the additional digit 1. The symbol therefor is +.3R.$i$.1. The registers now occupy the position VII. In the seventh stroke, the contents of the second register are added to those of the first register, the new contents of the first register and the contents of the third register are shifted to the right over three digit places, there is no inversion and the additional digit 0 is memorised (that is to say, the additional digit 1 initially present is replaced by 0). The symbol therefor is +.3R.$n$.0. The registers now occupy the position VIII. The operations performed in the last four strokes amount to the replacement of 0110110 by

−0000010+0001000+0110000=−0000010
+0111000=−0000010−0001000+1000000

In the position VIII, the result appears in the combined first and third register.

The multiplication is thus substantially performed in accordance with known calculations used when multiplying in the decimal system. However, shifting of partial products to the left has been replaced by shifting partial results to the right, which is equivalent thereto in arithmetical respect. Furthermore, each partial product is added directly to the partial result instead of first all partial products being produced and then added. Since the binary system contains only the digits 0 and 1, the partial products are either equal to 0 or equal to $y$ (i.e., the contents, inverted or not inverted, of the second register). The higher rate of calculation according to the invention consists in that one, two or three zeroes of the number $z$ are jumped over and that digit combinations such as 011 and 111 are replaced by −0001+0100 and −0001+1000, respectively.

Since the number $z$ is shifted from the third register in a stepwise manner, digit places come free in steps at the other end of the third register; these digit places are utilized by shifting into them the digits coming from the first register. The boundary between the partial results and the number $z$ lies at the line $\alpha$ (FIG. 1). However, to prevent the control member from receiving information about digits of the result or a partial result which do not belong to the number $z$, the third register has three digit places more than is required for the number $z$, which digit places are always filled with zeroes. In FIG. 1, these are the three zeroes between the lines $\beta$ and $\alpha$. The process is terminated when the line $\alpha$ has reached the right-hand end of the third register, which may be ascertained by counting the number of strokes of the machine. One stroke with a shift over $s$ digit places to the right must in this case count as $s$ strokes. This may be effected by means of a counting member which receives information from the micro-control circuit.

It also appears from FIG. 1 that upon shift strokes the first register must in certain cases be supplemented with digits 0 and in other cases with digits 1. In order to make clear when the one condition and when the other condition occurs, the first and second registers are provided with three additional digit places which are initially filled with zeroes. In FIG. 1, these are the digit places at the left of the line $\gamma$. Since the three additional digit places in both the first and the second register always contain the same digits, this information can already be supplied by a single additional digit place of the first and the second register. Consequently, these registers must be so designed that they are fed at the left-hand end with the digits present in the additional digit places upon shifts to the right.

FIG. 2 shows the complete diagram of instructions which the control circuit must supply to the calculating unit. The column $s$ indicates whether the number $y$ is registered in the second register in the ordinary form (+) or in the inverted form (−), the column $e$ indicates whether in the previous stroke an additional digit 0 or 1 has been memorised, whilst the column op. indicates the micro-instruction (operation) to be performed. The significance of the column $c$ will be discussed in greater detail hereinafter. Situations which never occur (for example the situation $z_2$, $z_1$, $z_0$, $s$, $e$ is 000−0) are omitted in this diagram. The cases which occur in FIG. 1 are found in FIG. 2 on the lines: 8, 12, 13, 7, 10, 24, 13.

FIGS. 3, 4 and 5 show the complete instruction diagrams for the cases that the control member explores the last two, four and five digits, respectively, of the number $z$.

FIG. 6 shows a diagram of the adjacent extremities of the three registers and the corresponding part of the arithmetic element. In this figure, reference numeral 1 indicates the first register, 2 the second register, 3 the third register, 4 the arithmetic element, that is to say an adding-element, which is permanently connected to the registers 1 and 2 (arrows 26 and 27) and produces the sum of the numbers registered in these registers. When an addition is to be performed, a conductor 19 (0) is energized by the micro-control circuit at the instant of a clock pulse whereby the gates $\mathbf{8}_0$, $\mathbf{8}_1$, $\mathbf{8}_2$, . . . are opened and the sum present as information in the adding element is written in the register 1. When a conductor 20 ($p$) is energized, gates $\mathbf{9}_0$, $\mathbf{9}_1$, $\mathbf{9}_2$, . . ., $\mathbf{11}_{40}$, $\mathbf{11}_{39}$, $\mathbf{17}_{38}$, $\mathbf{17}_{37}$, $\mathbf{17}_{36}$, . . . are opened, so that the sum present as information in the adding element 4 is written, shifted to the right over two digit places in register 1 and the beginning of register 3, and the contents of the remaining part of register 3 are shifted to the right over two digit places. This amounts to the operation +.2R, which thus takes place in one stroke. Energization of a conductor 21 ($q$) causes gates $10_0$, $10_1$, $10_2$, . . ., $12_{40}$, $12_{39}$, $12_{38}$, . . ., $18_{37}$, $18_{36}$, . . . to be opened, so that the operation +.3R is carried out.

Shifts without additions may be performed by energisation of conductors 22, 23, 24, ($u$, $v$, $w$). If, for example, 22 ($u$) is energized, gates $13_0$, $13_1$, $13_2$, . . . $16_{40}$, $16_{39}$, $16_{38}$, . . . are opened and the contents of the combined registers 1 and 3 are thereby shifted to the right over one digit place; this is the operation 0.1R. Energisation of conductor 23 ($v$) opens gates $14_0$, $14_1$, $14_2$, . . . $17_{40}$, $17_{39}$, $17_{38}$, . . . so that the contents of the combined registers 1 and 3 are shifted to the right over two digit places (the operation 0.2R). Energisation of conductor 24 ($w$) opens gates $15_0$, $15_1$, $15_2$, . . ., $18_{40}$, $18_{39}$, $18_{38}$, . . . so that the contents of the combined registers 1 and 3 are shifted to the right over three digit places (the operation 0.3R). Finally a conductor 25 ($i$) leads to the second register 2. This register may be so designed that its contents are replaced by its true complement when conductor 25 is energized. Thus upon energisation of this conductor, the operation $i$ is carried out. Another solution consists in that upon energization of conductor 25 by the micro-control circuit at the instant of a clock pulse, the contents of register 2 are replaced by its false complement while at the same time an input information with the function of a zero$^{th}$ carry is led to the first section of the adding element, every time that number $y$ appears in the second register in its false complement form. This information may be derived, for example, from the additional digit place at the left-hand end of the second register (to the left of the line $\gamma$), since the contents of this digit place indicates whether the number $y$ is registered in the second register in its true form or in its false complement form. Consequently, the adding-element always produces the sum, or the difference, of the contents of the first register and the number $y$.

In column $c$ in FIG. 2, it is specified which of the six conductors $u$, $v$, $w$, $p$, $q$, $i$ must in each case be energized. Written in the Boole-algebraic form, one reads from this figure the formulae:

FORMULAE $$u=\bar{z}_2z_1\bar{z}_0s\bar{e}_1+z_2z_1\bar{z}_0s\bar{e}_1+\bar{z}_2z_1\bar{z}_0\overline{se_1}+z_2z_1\bar{z}_0\overline{se_1}+\bar{z}_2\bar{z}_1z_0se_1+z_2\bar{z}_1z_0se_1,$$

$$v=z_2\bar{z}_1\bar{z}_0s\bar{e}_1+\bar{z}_2z_1z_0se_1,$$

$$w=\bar{z}_2\bar{z}_1\bar{z}_0s\bar{e}_1+z_2z_1z_0se_1,$$

$$p=z_2\bar{z}_1z_0s\bar{e}_1+\bar{z}_2z_1z_0\overline{se_1}+z_2\bar{z}_1\bar{z}_0se_1+\bar{z}_2z_1\bar{z}_0\bar{s}e_1,$$

$$q=\bar{z}_2\bar{z}_1z_0s\bar{e}_1+z_2z_1z_0\overline{se_1}+\bar{z}_2\bar{z}_1\bar{z}_0se_1+z_2z_1\bar{z}_0\bar{s}e_1,$$

$$i=\bar{z}_2z_1z_0s\bar{e}_1+z_2z_1\bar{z}_0s\bar{e}_1+z_2z_1z_0s\bar{e}_1+\bar{z}_2z_1\bar{z}_0\overline{se_1}+z_2z_1z_0\overline{se_1}+\bar{z}_2z_1\bar{z}_0se_1+z_2\bar{z}_1z_0se_1+z_2z_1\bar{z}_0se_1+\bar{z}_2\bar{z}_1\bar{z}_0\bar{s}e_1+\bar{z}_2z_1\bar{z}_0\bar{s}e_1+z_2\bar{z}_1\bar{z}_0\bar{s}e_1+z_2\bar{z}_1\bar{z}_0\bar{s}e_1,$$

$$e_0=\bar{z}_2z_1z_0\overline{se_1}+z_2z_1z_0\overline{se_1}+\bar{z}_2\bar{z}_1z_0se_1+\bar{z}_2z_1\bar{z}_0se_1+\bar{z}_2z_1z_0se_1+z_2\bar{z}_1z_0se_1+z_2z_1\bar{z}_0se_1+z_2z_1z_0se_1+\bar{z}_2\bar{z}_1\bar{z}_0\bar{s}e_1+\bar{z}_2z_1\bar{z}_0\bar{s}e_1+z_2\bar{z}_1\bar{z}_0\bar{s}e_1+z_2z_1\bar{z}_0\bar{s}e_1,$$

$$\bar{e}_0=\bar{z}_2\bar{z}_1\bar{z}_0s\bar{e}_1+\bar{z}_2\bar{z}_1z_0s\bar{e}_1+\bar{z}_2z_1\bar{z}_0s\bar{e}_1+\bar{z}_2z_1z_0s\bar{e}_1+z_2\bar{z}_1\bar{z}_0s\bar{e}_1+z_2\bar{z}_1z_0s\bar{e}_1+z_2z_1\bar{z}_0s\bar{e}_1+z_2z_1z_0s\bar{e}_1+\bar{z}_2z_1\bar{z}_0\overline{se_1}+z_2z_1\bar{z}_0\overline{se_1}+\bar{z}_2\bar{z}_1\bar{z}_0se_1+z_2\bar{z}_1\bar{z}_0se_1,$$

In these formulae, for example, the term $z_2\bar{z}_1\bar{z}_0s\bar{e}_1$ of the expression for $v$ means the case line 5 of FIG. 2, that is to say the case $z_2=1$, $z_1=0$, $z_0=0$, $s=+$, $e_1=0$, the term $\bar{z}_2z_1z_0se_1$ means the case line 16 of FIG. 2, that is to say the case $z_2=0$, $z_1=1$, $z_0=1$, $s=+$, $e_1=1$. The expression $z_2\bar{z}_1\bar{z}_0s\bar{e}_1+\bar{z}_2z_1z_0se_1$ for $v$ means that the conductor $v$ must be energized if the case $z_2\bar{z}_1\bar{z}_0s\bar{e}_1$ or the case $\bar{z}_2z_1z_0se_1$ occurs (hence the case line 5 or the case line 16). The expression for $e_0$ gives all cases in which an additional digit 1 must be memorised and the expression for $\bar{e}_0$ gives all cases in which the additional digit 0 must be memorised. In this connection it is to be noted that in the formulae distinction must have been made between the input information $e_1$ and $\bar{e}_1$, respectively and the output information $e_0$ and $\bar{e}_0$, respectively, of the additional digit. FIGS. 7 and 7$a$ show a circuit arrangement built up of and-gates and or-gates, which realizes these Boole-algebraic formulae, but it is to be noted that this is not the only circuit possible, since every Boole-algebraic expression, considered theoretically, can be technically realized in an infinite number of ways. Thus, for example, it is possible to simplify the expressions for $u$, $i$, $e_0$ and $\bar{e}_0$ to:

$$u=z_1\bar{z}_0\bar{e}_1+\bar{z}_1z_0se_1$$

$$i=\bar{z}_0\bar{s}e_1+z_1\bar{z}_0e_1+\bar{z}_2z_1\bar{z}_0\bar{s}+z_1z_0s\bar{e}_1+z_2z_1z_0\bar{e}_1+z_2z_1s\bar{e}_1+z_2\bar{z}_1z_0se_1$$

$$e_0=z_1se_1+z_0se_1+\bar{z}_0\bar{s}e_1+z_1z_0\overline{se_1}$$

$$\bar{e}_0=s\bar{e}_1+z_1\bar{z}_0\overline{se_1}+\bar{z}_1\bar{z}_0se_1$$

and to indicate for the micro-control-circuit an arrangement built up of and-gates and or-gates, which is based on these simplified formulae. The information $s$ and $\bar{s}$ may be derived from the additional digit place (to the left of the line $\gamma$ in FIG. 1) at the left-hand end of the first register. The manner in which a Boole-algebraic expression can be technically realized by means of and-, or-, and inversion gates is fully described in an article by Serell "Elements of Boolean algebra for the study of information handling systems" (Proceedings of the I.R.E., vol. 41, 1953, pp. 1366–1379). The informations $u$, $v$, $w$, $p$, $q$, $i$, are applied at the instants of the clock pulses to the conductors 22, 23, 24, 20, 21, 25 shown in FIG. 6. This can be performed by means of and-gates receiving the pertinent informations $u$, $v$, $w$, $p$, $q$, $i$, and the clock pulses. With the circuit built up of and-gates and or-gates as shown, which realizes the Boole-algebraic formulae given above, and the numbers $x$, $y$, $z$ registered in the respective registers, connections are made from the terminals shown in the upper part of FIG. 7$a$ to the points shown next to the terminals. Six terminals are shown, these being $Z_0$, $Z_1$, $Z_2$, $\bar{Z}_0$, $\bar{Z}_1$, $\bar{Z}_2$, S and $\bar{S}$. The connection is therefore seen to be to the three least significant digits of the number Z (when shifting to the right) and the additional digit place of the first register. In response to these inputs, the micro-control circuit produces signals at the outputs of the or-gates of FIG. 7$b$ to perform the machine operation.

FIGS. 8 and 9 show circuits of the sections $1_0$ and $3_{37}$ of the registers 1 and 3 with the associated gates $8_0$, $9_0$, $10_0$, $13_0$, $14_0$, $15_0$, and $16_{37}$, $17_{37}$, $18_{37}$ respectively. The gate $8_0$ realizes the Boole-algebraic expressions $\bar{x}_0{}^*0$ and $x_0{}^*$; the gate $9_0$ the expressions $\bar{x}_2{}^*p$ and $x_2{}^*p$; the gate $10_0$ the expressions $\bar{x}_3{}^*q$ and $\bar{x}_3{}^*q$; the gate $13_0$ the expressions $\bar{x}_1u$ and $x_1u$; the gate $14_0$ the expressions $\bar{x}_2v$ and $x_2v$; the gate $15_0$ the expressions $\bar{x}_3w$ and $x_3w$; the gate $16_{37}$ the expressions $\bar{z}_{38}u$ and $z_{38}u$; the gate $17_{37}$ the expressions $\bar{z}_{39}v+\bar{z}_{39}p$ and $z_{39}v+z_{39}p$; the gate $18_{37}$ the expressions $\bar{z}_{40}w+\bar{z}_{40}q$ and $z_{40}w+z_{40}q$. The little stars added to the characters $x_0$, $x_2$ and $x_3$ indicate that the relevant information must not be derived from register 1, but must be derived from adding element 4. These members are built up from and-gates A and or-gates 0 on known principles.

The calculating speed may be increased still further by giving the calculating unit also a register 2' in which the true complement of the number $y$ is registered. Strokes in which there is exclusively an inversion with or without the introduction of an additional digit (lines 4, 8, 15, 19, 21, 23 of FIG. 2) are in this case superfluous since the true complement of $y$ is always present and need not be produced in a separate stroke. If desired, the arithmetic element may also comprise a second adding element 4', which provides the sum of the numbers registered in the registers 1 and 2'. The micro-control circuit must in this case provide the information $n$ and $i=\bar{n}$ about inverting or non-inverting. When a conductor $n$ is energized, the information of the adding element 4 is transferred to the register 1 and when a conductor $i$ (with the information $i=\bar{n}$) is energized, the information of the adding element 4' is transferred to the register 1. In the multiplication this is always accompanied by a shift to the right over at least two digit places, so that the last two or three digits of the sum are written in the register 3. It is practical to give the symbol $+.sR.i.0$ in this case the significance: transfer the information from the second adding element 4', shifted to the right over $s$ digit places, to the first register and possibly part of the third register and memorise the additional number 0. The symbol $+.sR.i.1$ then has the significance: transfer the information of the second adding element 4', shifted to the right over $s$ digit places, to the first register and possibly part of the third register and memorise the additional digit 1. Operations of the form $0.sR.i.0$ (according to the old notation) are now superfluous for $s<n$, since they may be replaced by operations of the form $+.SR.i.1$ (according to the new notation), but strokes are now introduced in which the arithmetic element is switched over from the register 2 to the register 2', or conversely. Another means of speeding up calculation is to give the calculating unit two arithmetic elements, for example an adding element and a difference producer so that both the sum and the difference of the numbers registered in the first and second registers are available at any moment and inversion strokes are superfluous, whilst the time required for the change-over is substantially negligible.

From FIG. 6 it appears that the greatest additional complication of the calculating unit results from the shifts. For this reason, it may be practical for the shifts to be limited to shifts over zero, one, two and three places, but to explore in each case four or five digits of the third register. This substantially amounts to the use of the instruction diagram shown in FIG. 4 or FIG. 5, with replacement of the operations 4R and 5R by the operation 3R. True, the calculating unit then operates at a lower rate than a calculating unit which utilises the instruction diagram of FIG. 4 or FIG. 5, but at a higher rate than the calculating unit which utilizes the instruction diagram of FIG. 3. The registers 1, 2 and 3 are in this case as complicated as shown in FIG. 6, but the micro-control circuit is a little more complicated. This latter fact, however, does not involve any appreciable inconvenience.

After the foregoing extensive explanations, the further elaboration of these variants does not cause difficulty and neither does the elaboration of the cases in which $n$ has a value differing from 3 and greater than unity. Furthermore, one is not limited to the instruction diagrams shown in FIGS. 2, 3, 4 and 5, since evident modifications may be made therein which do not change or substantially do not change the calculating speed.

In conclusion, it is to be noted that the machine may be built up in a manner such that it is difficult or even impossible to indicate therein parts which must be indicated as the register, etc. since the machine may be of a structure such that the same member thereof at one moment fulfills the function of a register and at another moment fulfills the function of an adding element, or in a more general sense, performs successively different functions. In such cases the above-mentioned terms register, adding element, micro-control circuit etc. must be regarded to bear upon those parts of the machine which fufill, at the moment considered, the functions of a register adding element, micro-control circuit, etc.

It is also mentioned that the inventive idea is independent of the numerical system in which the calculating unit operates and is also applicable, for example, to a computer which calculates in the ternary system, more particularly with digits representing the values 0, +1, −1.

What is claimed is:

1. A parallel-operating synchronous digital computer capable of performing the calculation $x+y.z$ automatically, comprising a calculating unit including a first register for registering the number $x$, a second register for registering the number $y$ and a third register for registering the number $z$, an arithmetic element for producing the sum or difference of the numbers registered in the first and second registers, said calculating unit transferring the result of said sum or difference to the first register and a part of the third register, said calculating unit also effecting shifts in the first and third registers, said transfer and shifts being controlled in response to signals derived from a micro-control circuit which comprises means for sensing information about the least significant digit of the number $z$ and a predetermined number of succeeding digits $(n-1)$ of the number $z$, where $n\geqq 2$, said micro-control circuit comprising a logical circuit having inputs to which are applied signals representative of said digits and having outputs connected to said calculating unit, said outputs producing control signals in response to the applied signals which control the transfer and shift operations of the calculating unit in accordance with the applied signals.

2. A computer as claimed in claim 1, comprising an inversion member for inverting the number registered in said second register under the control of the micro-control circuit, said micro-control circuit including means sensing an additional digit of the number $z$ and means for sensing the inversion condition of the number $y$.

3. A computer as claimed in claim 2, wherein shifts can be performed over 1, 2 . . . or $m$ digit places, where $m\leqq$the number of digits in the number $z$, and a digit combination having $t$ sequential zeroes in the number $z$ the additional digit taken into account produces a machine operation with a shift over a predetermined number of digit places.

4. A computer as claimed in claim 3 wherein a digit combination having $t$ sequential ones in the number $z$ the additional digit taken into account and the inversed condition of the number $y$ being sensed produces a machine operation comprising an inversion, where $t>1$.

5. A computer as claimed in claim 1, wherein shifts can be performed over 1, 2, . . . or $m$ digit places, where $m\leqq$the number of digits in the number $z$, and a digit combination having $t$ sequential zeroes in the number $z$ the additional digit taken into account produces a machine operation with a shift over a predetermined number of digit places.

6. A computer as claimed in claim 5, wherein a digit combination having $t$ sequential ones in the number $z$ the additional digit taken into account and the inversed condition of the number $y$ being sensed produces a machine operation comprising an inversion, where $t>1$.

References Cited in the file of this patent

UNITED STATES PATENTS

| | | |
|---|---|---|
| 2,666,575 | Edwards | Jan. 19, 1954 |
| 2,913,176 | Berezin | Nov. 17, 1959 |
| 2,925,218 | Robinson et al. | Feb. 16, 1960 |

OTHER REFERENCES

Ordvac Manual, published by the University of Illinois (Oct. 31, 1951), pp. 14 and 15 relied upon. Copy in Div. 23.)

Binac-Auerbach et al.: Proceedings of the IRE (January 1952), (p. 13 relied on). (Copy in Div. 23.)